Jan. 26, 1971  A. BEZOMBES ET AL  3,558,295
METHOD AND APPARATUS FOR THE SUPPORT AND
TRANSPORTATION OF GLASS
Filed Feb. 26, 1963  5 Sheets-Sheet 4
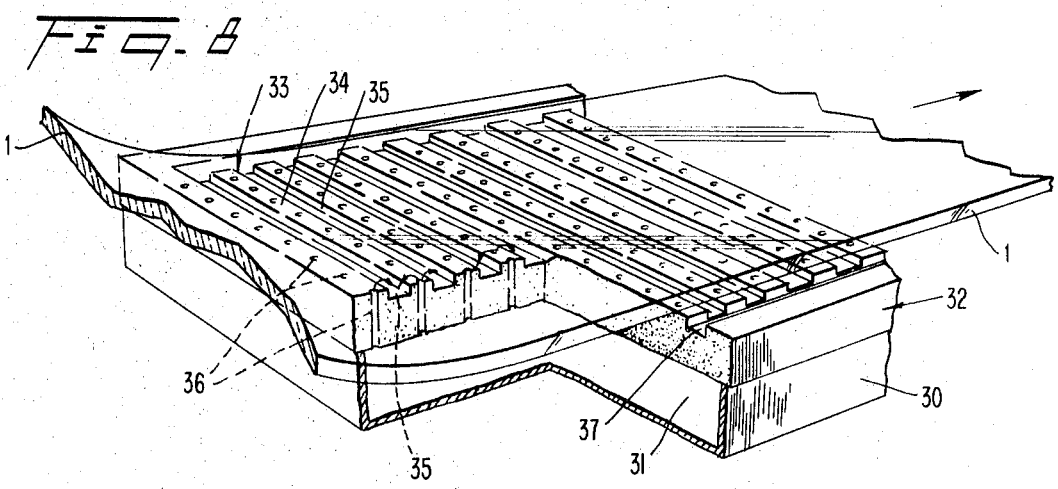
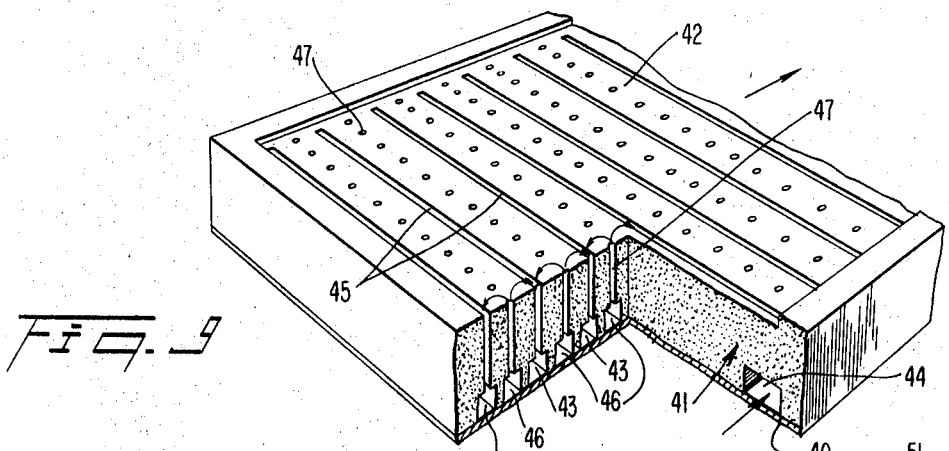
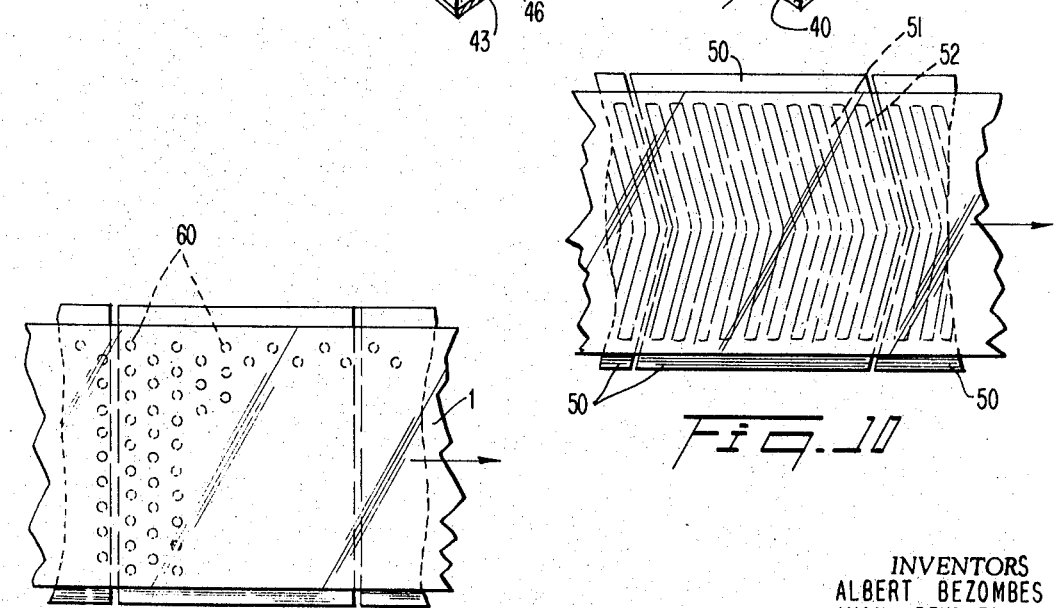
INVENTORS
ALBERT BEZOMBES
IVAN PEYCHES
PIERRE TISSIER
BY
Bauer and Seymour
ATTORNEYS

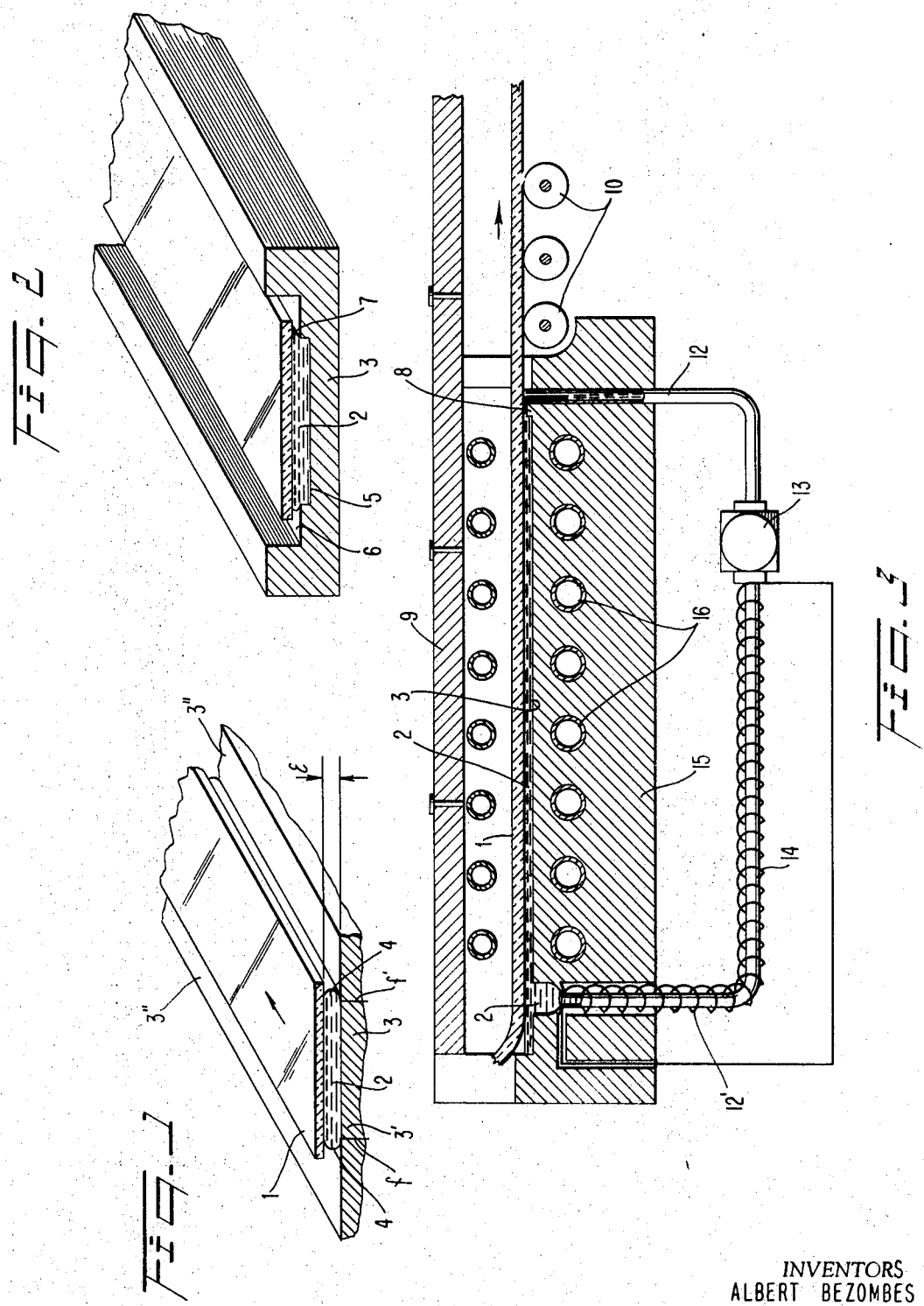

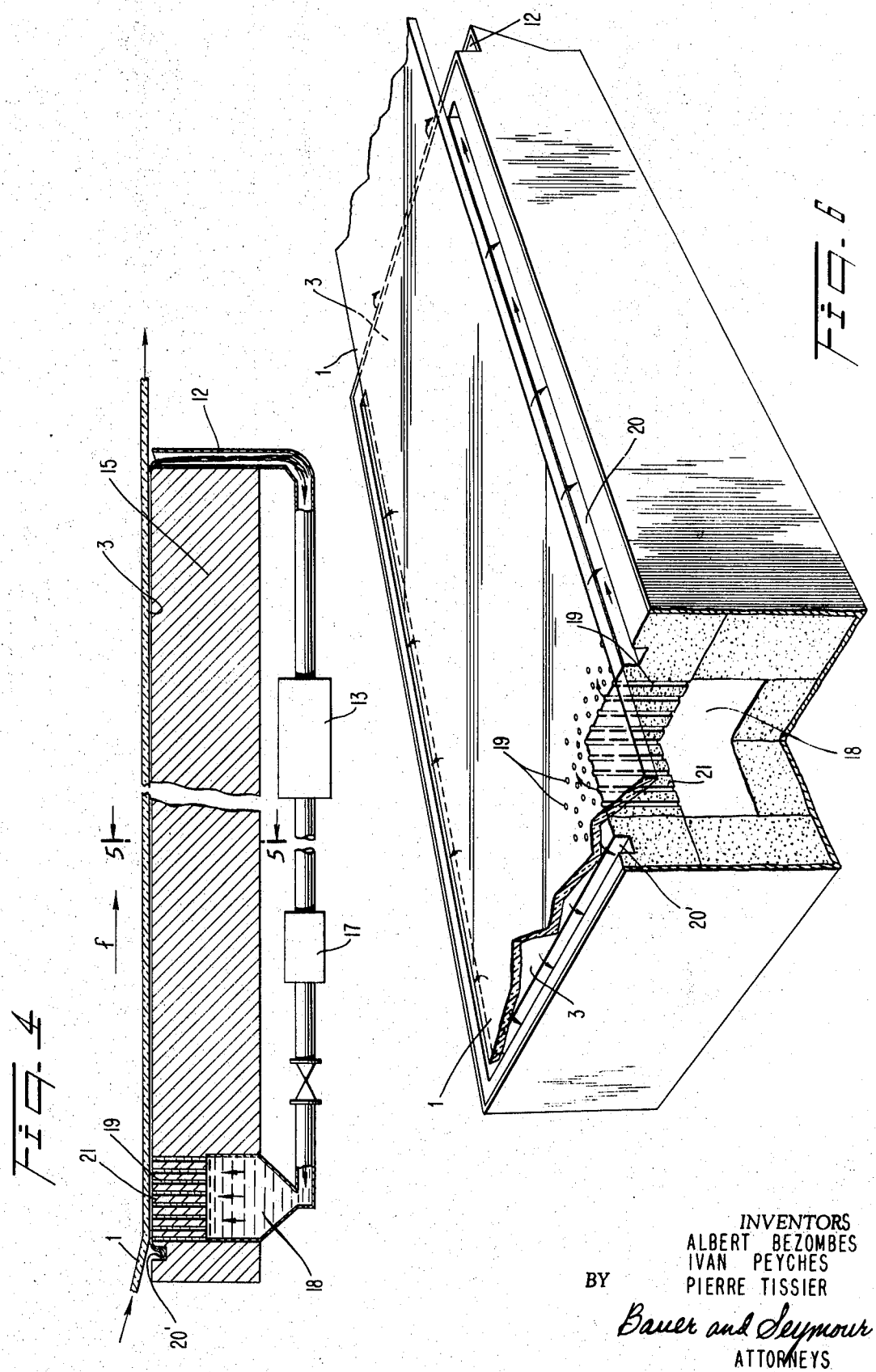

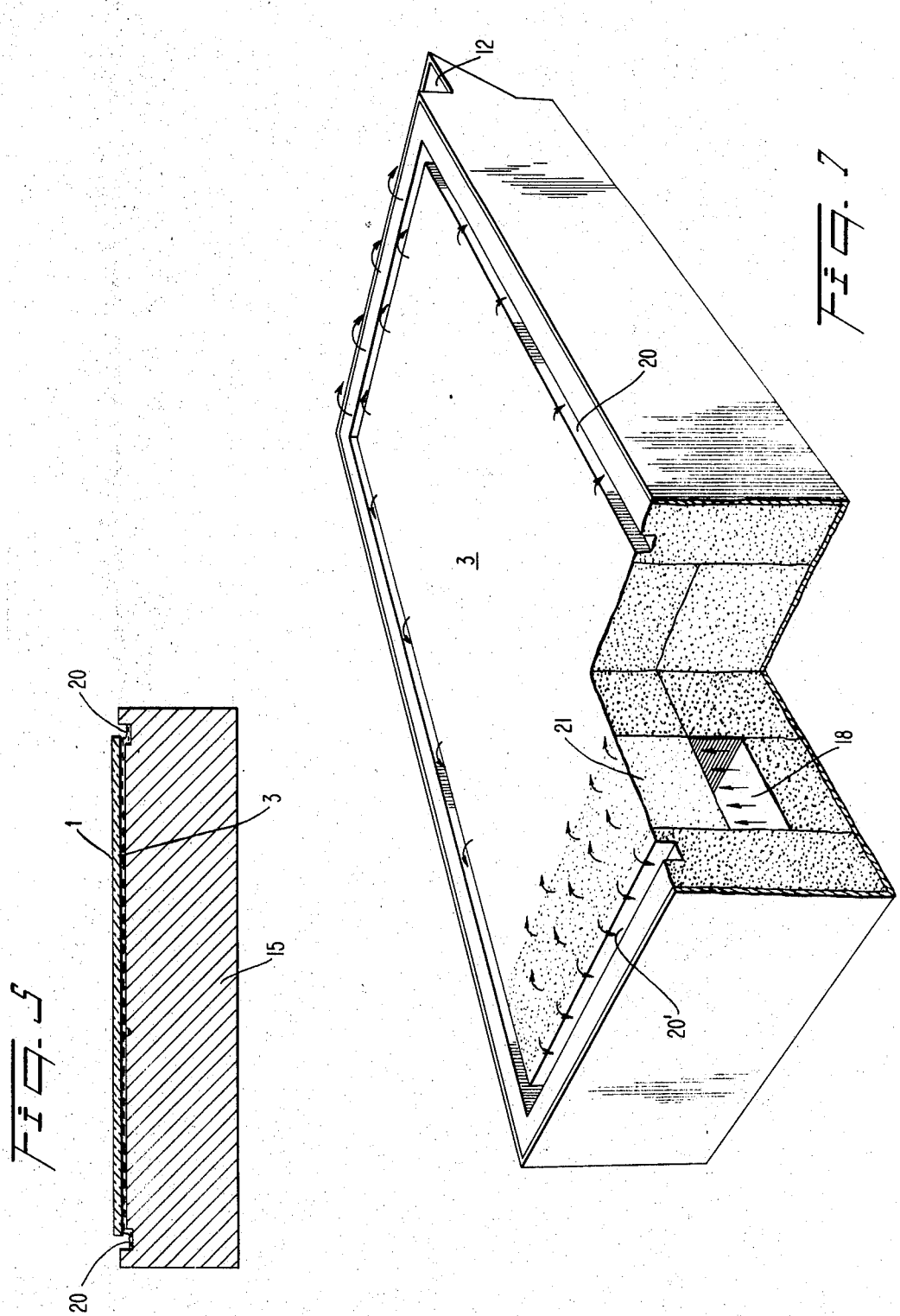

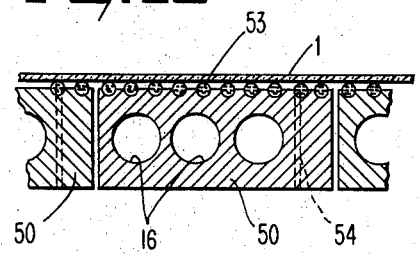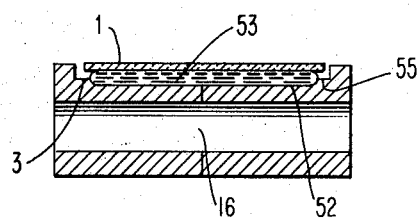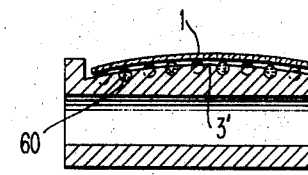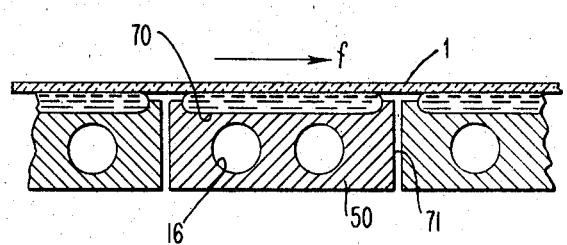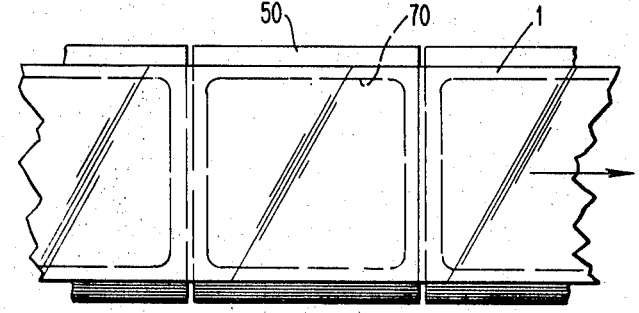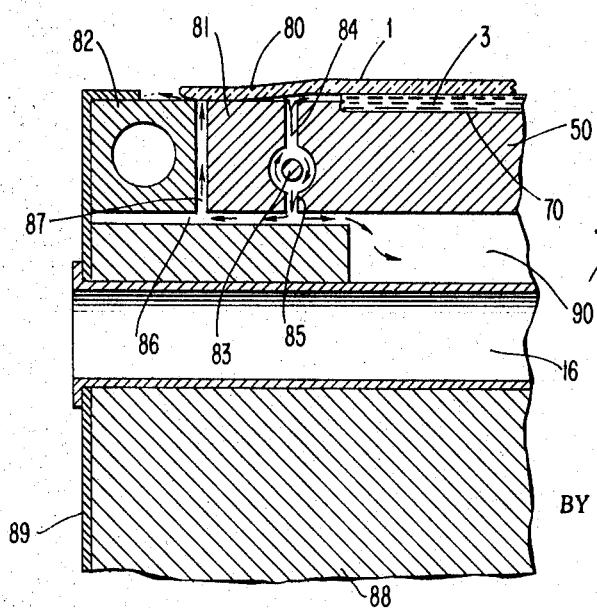
INVENTORS
ALBERT BEZOMBES
IVAN PEYCHES
PIERRE TISSIER
BY
Bauer and Seymour
ATTORNEYS United States Patent Office 3,558,295
Patented Jan. 26, 1971

3,558,295
METHOD AND APPARATUS FOR THE SUPPORT AND TRANSPORTATION OF GLASS
Albert Bezombes, Ivan Peyches, and Pierre Tissier, Paris, France, assignors to Compagnie de Saint-Gobain, Neuilly-sur-Seine, France
Filed Feb. 26, 1963, Ser. No. 261,098
Claims priority, application France, Mar. 1, 1962, 889,640, 889,641; Jan. 5, 1963, 920,547
Int. Cl. C03b 9/00, 18/00
U.S. Cl. 65—66                     43 Claims

ABSTRACT OF THE DISCLOSURE

Apparatus for the handling of flat glass which comprises a floor adapted to carry a sheet of glass, means to form a sheet of glass, to lay it on the floor, and move it over the floor, and a liquid medium interposed and acting as a bearing between the floor and the sheet consisting essentially of molten metal in just sufficient thickness when balanced between the surface tension of the metal and the force of gravity acting on the sheet to carry the sheet out of contact with the floor. A method of making flat glass wherein a sheet of flat glass is formed from molten glass and is deposited on and moved over the receiving floor of a solid bed, the step which comprises interposing between the sheet and the floor a support of molten metal of thickness measured above the floor not substantially greater than that of the glass sheet, not larger than the glass sheet, and so disposed as to separate the sheet from the floor, cooling the sheet progressively as it advances over the floor until it can be handled without damage by other handling means, and transferring the glass to other handling means.

---

This invention relates to the manufacture of flat glass, a term which includes all sheet glass products whether flat or curved.

It has been suggested to deposit glass, either in the molten state or already formed into a sheet but in the plastic state, over a liquid support constituted by a bath of a liquid having a density superior to the density of the glass. In such a process the glass is maintained at the surface of the bath by hydrostatic forces.

An important space is then maintained between the edges of the sheet and the walls of the bath-containing tank so that, when an oxidizable molten metal, such as tin, is used as supporting liquid, the molten metal has to be protected from an oxidation by air with a reductive or inert atmosphere which can be obtained only by providing an important apparatus delicate to carry out. Great quantities of metal are required to fill the tank and this prohibits the use of rare and precious metals, or of the alloys of these metals, which are slightly or not at all oxidizable by air.

A further difficulty arises in withdrawing the sheet from the metal bath as, to prevent the sheet from entering in contact with the sides of the liquid-containing tank, the sheet must be raised from the horizontal plane of the bath to a higher plane such as the plane of a mechanical conveyor placed behind the bath. This can be accomplished without deforming the surface of the glass only if the glass is at that moment already very strongly cooled.

It is an object of this invention to make the noble metals available as supports for glass in a plastic state.

Another object is to produce flat glass with fire polished aspect free of surface defects. Another object is to transport moving flat glass in a plastic condition on a fluid while simultaneously according it the support of a solid body. Another object is to control the cooling of moving flat glass with greater precision than has been possible on liquid baths and thereby to avoid the production of the surface defects which arise from inequalities of cooling. Other objects are to support flat glass in the plastic state on noncapillary films of molten metal, on flowing sheets of molten metal, on thin, immobile sheets of molten metal, and on a plurality of bodies of molten metal of not great thickness.

The objects of the invention are accomplished, generally speaking, by a method of casting flat glass which comprises forming a sheet from molten glass, forming a thin support of molten metal upon a receiving surface, laying the glass sheet on and drawing it over the thin molten metal support, and cooling the glass sheet as it moves over the thin support of molten metal until it can be handled without marring by other supporting means.

The apparatus by which this invention is carried out is also novel and is another object of the invention.

The accompanying drawings show, by way of examples and without restrictive effect, different forms of carrying out the apparatus according to the invention.

FIG. 1 is a sectional perspective view of one form of the invention;

FIG. 2 is a sectional perspective view of a preferred modification of the form shown in FIG. 1;

FIG. 3 is a vertical longitudinal section of an apparatus capable of carrying out the invention in one of its forms;

FIG. 4 is a vertical longitudinal section through another apparatus for carrying out the invention;

FIG. 5 is a cross section on line IIII—IIII of FIG. 4;

FIG. 6 is a perspective view partly in section of the apparatus of FIG. 4;

FIG. 7 is a sectioned perspective view of a modified form of apparatus of the type of FIG. 4;

FIG. 8 is a sectioned perspective view of another form of apparatus;

FIG. 9 is a sectioned perspective of a modification of the apparatus shown in FIG. 8;

FIG. 10 is a plan view of apparatus operating on a somewhat different principle;

FIG. 11 is a plan view of a modified form of apparatus embodying the principles of FIG. 10;

FIG. 12 is a vertical longitudinal sectioned view through either FIG. 10 or FIG. 11;

FIG. 13 is a vertical cross section of the apparatus of FIG. 10 following a chevron;

FIG. 14 is a vertical cross section through a modified form of apparatus of the type shown in FIG. 11;

FIG. 15 is a vertical longitudinal section through apparatus of which FIG. 16 is the plan view;

FIG. 17 is a fragmentary vertical cross section through a modified form of apparatus showing a device for edge control of the sheet of glass;

FIG. 18 is a diagrammatic view of the apparatus showing a furnace F, sheet forming rollers R, the sheet 1, the floor 3, the liquid bearing 2, and driven rollers $R_2$ which carry the sheet away from the floor.

FIGS. 1, 2, 11, 12, 13, 14, 15 and 16 have certain principles in common and will be discussed first.

In FIG. 1 a sheet of glass 1 has been laid upon the flat surface of floor 3, a layer of molten metal 2 being interposed between the floor and the sheet of glass. The floor 3 may be composed of some material which is not wetted by the molten metal, for instance carbon, preferably graphite. If desired, central section 3' of the floor may be made of a material which is wetted by the metal and the outer portions 3" may be made of a material which is not wetted by the metal. Under either of these circumstances the sheet of molten metal assumes a form having rounded edges 4 and supports the glass sheet out of contact with the floor. The sheet of glass is larger than the supporting sheet of molten metal.

In FIG. 2 is shown a modification in which the floor 3 is provided with a central trough 5 which receives a thin sheet of metal 2 which is present in sufficient quantities to project above the level 6 of the floor and to form the curves 7. The trough is made of material which is not wetted by the metal.

In FIG. 3 is diagrammatically shown an apparatus which is adapted to carry out the invention. In this figure the floor 3 is provided with a shallow central trough 5 having raised edges which contain the molten metal on 3 sides, and a weir 8 at the downstream end, downstream being considered as the direction in which the glass is moving as shown by the arrows. The sheet of glass 1 comes from rollers, not shown, and is laid on the molten metal 2, for instance molten tin, which fills the trough. The glass progresses through a temperature reducing lehr 9, the operation of which is not necessary to the present description, and is drawn off and on to a series of rollers 10. The molten metal pours over the weir 8 into conduit 12 and proceeds to pump 13 where it is forced through conduit 12', which is electrically heated by coil 14, to the upstream end of the trough. The weir stabilizes the thickness of the film or layer of molten metal. The floor 3 is the upper surface of a refractory block 15 through which extend thermal pipes 16 which control the temperature of the floor at different parts of its length. By maintaining an even flow of the molten metal over the weir the surface of the glass is kept out of contact with solid objects until it has been cooled to a viscosity at which it is not marred by contact with ordinary handling means such as metal rollers.

In FIG. 4 is an apparatus similar to that of FIG. 3 except that the pump 13 drives the molten metal to a cleaner 17 from whence it passes to a container 18 and thence through conduits 19 from which it wells up beneath the glass sheet 1 as it is laid upon the support. The molten metal issues beneath the glass sheet either as a sheet or as a multitude of droplets or drops which support the glass sheet and keep it out of contact with the floor 3. Channels 20 are provided along the edges of the glass sheet to receive any of the molten metal which passes out from under the sheet 1. In general the surface tension of the molten metal is sufficient to prevent this escape except in minor quantities. The upstream end is also provided with a channel 20' to receive any upstream overflow from the conduit 19. These conduits are formed through a block 21, which may be of the same refractory material of which the floor 3 is composed. In this form of the invention the weir is not used, the glass sheet being kept off the solid floor by the film of molten metal which is entrained and drawn along by the moving sheet. The construction of this apparatus is somewhat more fully explained in FIG. 6 which bears the same numerals.

In FIG. 7 is shown an extremely useful modification of the apparatus of FIG. 6 in which the block 21 is porous, being made of porous refractory for instance. In this instance the pressure applied by the pumps to the molten metal in chamber 18 causes the metal to seep upward through the pores and form a film on the surface of the floor which insulates the glass sheet from contact with the material of the floor.

At this time it will be useful to observe that the several apparatus which have been described hereinabove and those which follow do not necessarily operate by the same process or the same phenomena.

In FIG. 8 is a structure involving the use of a plurality of separate supporting units. A metallic base 30 encloses a sump 31 which is filled with molten metal under hydrostatic pressure which may be provided by a system similar to that of FIG. 3. Above the metallic base is a bed 32 of refractory material, for instance graphite, which provides a floor 33 which supports the glass sheet 1. The floor is provided with alternate lands 34 and grooves 35 which are disposed transversely to the direction of motion of the glass sheet. The lands contain conduits 36 which extend upward from the sump and deliver a uniform flow of molten metal to the surface of the lands. As the glass sheet progresses, it is supported by the molten metal on the surface of the lands. The width of the grooves is such that the glass does not tend to sag into them but remains in a plane which is established by the surfaces of the lands. As the molten metal leaves the surface of the lands, it enters the grooves and passes to the side channels 37 from whence it flows to a pipeline leading to the pump which applies hydrostatic pressure to the sump. The rate of flow of the molten metal through the channels 37 may be controlled so that the grooves can either be filled, providing a continuous metallic surface, or not filled as desired. For ordinary purposes, grooves having a width of 1 cm. are satisfactory.

In FIG. 9 is shown a modification of the apparatus of FIG. 8 in which a metallic plate 40 rests upon the floor of the furnace room, a refractory bed 41 rests upon the plate and is provided with a floor 42. A series of conduits 43 extends through the bed above the plate. These conduits connect at one side of the apparatus with a longitudinally extending conduit 44. Slots 45 connect these conduits with the floor, serving to drain off from the floor all the metal except a thin layer which serves to support the glass sheet, to keep it out of contact with the floor, and to lubricate its passage.

Another series of conduits 46 extends through the base of the bed to a conduit, similar to 44 but located on the opposite side of the apparatus, which contains molten metal, under pressure, which passes through the conduits 46 and 47 to reach and cover the surface of the floor.

In FIGS. 10 to 16 is shown yet another principle of construction and operation in which a series of pits 50, under temperature control by pipe 16 is provided on the surface of the floor. These may be circular, or may be shallow grooves 52 between lands 51 of which the grooves are overfilled with molten metal 53. In FIG. 10 the grooves have the shapes of chevrons. Gas conduits 54 permit the introduction of gases such as hydrogen or of inert gases such as argon and nitrogen beneath the sheet. The metal does not wet the surface of the floor and is in sufficient quantity to extend slightly above the level of the floor. The surface tension of the metal is sufficient to sustain the weight of the glass sheet. There is thus provided what is in effect a plurality of liquid bearings which support the sheet out of contact with the floor and offer a minimum of friction to its passage. The chevron form of the grooves prevents sagging of the sheet even when the grooves are spaced more widely than is permissible with rectilinear grooves. Molten metal can be flowed along the channels 55 to replenish the metal in the grooves, if needed.

The introduction of nonoxidizing gases through pipe 54 prevents the oxidation of the metal in the grooves and protects the surface of the glass.

The bed 50 may be made up of a series of blocks of any chosen size.

In FIG. 11 is shown a modification in which the grooves are replaced by pits 60 which are overfilled with molten metal and arranged in close, successive rows, each laterally offset with respect to the adjacent rows. The molten metal in this form of the invention acts, in effect, as liquid ball bearings whereas in FIG. 10 it acts as liquid roller bearings. In each case, the liquid projects above the level of the floor and sustains the weight of the glass by surface tension as neither the floor nor the glass are wetted by the metal.

In FIG. 14 is indicated an advantage which can be derived from the apparatus of FIG. 11, the floor 3' being convex like the crown of a road. The liquid bearings remain in their pits and the glass, being plastic, takes the curvature of the floor. This is advantageous in making curved glass for windshields. By imparting more than one curvature to the floor waved glass can be made.

In FIGS. 15 and 16 there is shown a modification in which the bed blocks 50 are provided with shallow trays 70 which are overfilled with molten metal which forms a support from side to side of the glass sheet, though not exceeding the glass width, and throughout substantial longitudinal lengths thereof. These constitute, in effect, liquid bearing pads upon which the glass is supported. Spaces 71 between blocks can be used for the introduction of inert, antioxidant or ion inhibiting gases.

It is sometimes desirable to support the entire width of the glass sheet on the molten metal but it is also desirable under certain circumstances to add a special treatment to the edge portions of the sheet. A device for accomplishing this purpose is shown in FIG. 17.

In FIG. 17, the sheet of glass 1 is centrally supported by the extension of molten metal 3 in a trough 70, in this respect the apparatus being similar to that of FIG. 16. The edges 80 of the glass lie on the supports 81 and 82 which extend longitudinally of the apparatus. The support block 81 may be composed of graphite or other refractory material and serves as a spacer between the support 82 and the block 50. Support 82 may be of steel provided with an inner pipe through which water may flow for the purposes of temperature control. This can be used to establish a gradient of temperature between the outer edge of the sheet and the portion which is supported by the bearing pad 3. A conduit 83 extends through the block 81 and serves to introduce a protective gas which passes through conduits 84, 85, 86 and 87, as indicated by the arrows, and serves to insulate the molten metal and the graphite block from contact with the air; if the gas is reducing, it protects the lower face of the sheet of glass against the possibility of reaction with the bearing liquid. The structure in general includes a masonry base 88, fire tube 16 extending there through, which may be used for either heating or cooling, and a metallic casing 89 which serves to contain the inert gas within a chamber 90 which extends under the bed 50.

An advantage of receiving the sheet upon a flat surface, or a surface shaped to produce a desired configuration of the glass, is that the solid, receiving surface is not responsive to shock. The difficulties which arose in prior systems using mechanical receiving apparatus arose from frictional contact with the surface, which produced abrasions in the glass. The present invention has the great advantage that it employs a solid surface and protects the glass by the interposition of the film, layer, or bearings of molten metal. In conformity with the invention, the sheet of glass may be in the plastic state without its levelness being affected by variations in the spacing of the liquid supports, provided that the glass does not remain motionless on them but is maintained in motion over them.

According to one form of the invention, such supports may be provided by overfilling cavities which are provided in the floor of the adjacent solid support with a liquid which is nonreactive and nonwetting (noncapillary) with respect to the glass and the solid support. The bearing surfaces extend above the floor, are formed by the liquid, and support the moving glass sheet by the surface tension of the molten metal in contact with glass. The moving sheet does not come in contact with the floor, except as desired.

The cavities in the floor may be of shaped and dimension as desired, such as circular or elliptical trays, rectilinear or broken-line grooves, small pits and the like.

According to another method of accomplishment, the bearing surfaces may be obtained by disposing the molten metal on restricted portions of the floor which are wetted by the liquid, which will not spread onto the adjacent areas of the support which cannot be wetted. This is illustrated in FIG. 1 in which the portion of the floor between lines $f-f'$ is made of material which can be wet by the liquid, and the portions outside those lines is made by material which is not wettable. The molten metal is applied to the portions which it can wet and there forms a part, thickness sigma, which is established by the balance of forces of gravity and surface tension.

It is not necessary in putting the invention in operation that the relative movement of the glass with respect to the bearings result in a displacement of the glass. If the sheet is maintained immobile in the plastic state, for instance for the duration of a thermal treatment, damage can be prevented by moving the bearings under the sheet, either by moving them with respect to the sheet or by continually altering the zones of contact. This can be achieved by introducing a reciprocation of the floor. Thus, the glass may be moved with respect to the floor or the floor may be moved with respect to the glass.

Liquid supports of different types, for instance of different materials, can be employed; it is possible to use the noble metals such as gold and especially silver, whereas the prior art was largely restricted to the use of molten tin. As these liquids have different melting temperatures, it is possible to select the molten metal with respect to the temperature which is being used at a particular location.

The liquid bearings offer meniscus supports for the sheet in motion over the floor and these meniscus are deformed unsymmetrically by a slight entrainment in the direction of the motion of the sheet. Thus the reduction of curvature of the meniscus is increased on the upstream and reduced on the downstream. There is a braking effect on the sheet of glass and the braking effect is the larger as the drag on the liquid bearing is the greater. Therefore, this phenomenon is of self-correcting character.

It is to be noted that the braking effect is opposed to the forces which advance the glass sheet so that, if the glass is in the plastic state, the pull on the sheet tends to draw it out and thin it down. It being unnecessary to hold the sheet by mechanical means above the drawing zone, it is only necessary, to avoid reduction of its width, to maintain its borders in position, either by conventional means such as are employed on the borders of sheets which are being drawn vertically or by the use of the apparatus and procedure set forth in FIG. 17 of this case.

It is possible to affect the braking forces either by modifying the inclination of the floor or by modifying the number and dimensions of the bearings. One may, for example, annul the braking forces or even achieve a driving effect on the glass sheet by sufficiently inclining the solid floor toward the discharge end. On the other hand, by inclining the floor toward the receiving end, the braking force is increased and will increase the forces of tension acting on the sheet, and may even become great enough to permit a drawing out of the ribbon, if it is in a state sufficently plastic, thus producing a sheet of reduced thickness and greater length.

It has been observed that in order to obtain substantial effects, it is advantageous to multiply the liquid bearings, thereby multiplying the braking action of the meniscus. This braking by each bearing, although small, may have, by multiplication, a substantial retarding effect. The size of the bearings, their number, and the intervals which separate them are selected so that the soft glass will not sag between bearings to make contact with the solid floor upon which the liquid of the bearings rests. If the glass sheet is at rest with respect to substantially spaced liquid supports, it will sag sooner or later. It is therefore necessary, when the glass is to have a plane surface, that it should be kept in motion over the floor. The same result is obtained if the liquid bearings move with respect to the glass sheet, for instance in a multitude of small drops. There is therefore a relation between speed of the sheet and the free interval between the liquid bearings, in the direction of movement, of course as a function of the temperature and viscosity of the glass. Experience has shown that for standard plate glass at a temperature of 900°, no deformation will affect the levelness of the sheet if it is moved at a speed of 1.5 meters per minute when the interval between bearings in the line of motion is about 1 cm.

The bearings may be in the form of bars, liquid rollers, which may be made by filling elongated depressions in the floor until they reject an excess. These bearings are preferably disposed parallel to one another across the lines of motion of the glass. The bearings may be divided into a number of distinct parts if desired and in staggered relation between adjacent grooves. It is possible to make the bearings in any desired shape, either straight or curved, but a satisfactory form is that of a chevron of which the angle is situated on the axis of the flat sheet and pointed in direction of movement of the sheet. In that case the braking forces are aligned obliquely toward the outside and have a component which tends to oppose the narrowing of the sheet. A similar result is obtained by using curved grooves, for example, the arc of a circle. In order to obtain a planar sheet, the lines of contact between the glass and the bearings should be horizontal but it is not indispensable that all the bearings be in the same horizontal plane. By inclining the support downward toward one or the other end of the floor, the braking forces can be increased or decreased. The floor instead of being flat, may be constituted by cylindrical surface on the generatrices of which the bearings are disposed, each bearing being thus horizontal and approximately perpendicular to the axis of motion of the sheet. The variations in curvature of the glass sheet, while it is in the plastic state, are without permanent effect on the final shape of the sheet provided that transformation to final shape takes place gradually and the sheet is in its final shape during the final stages of its transference from plastic to rigid.

While the form and location of the bearings has been discussed here and above only with respect to the production of a planar sheet, the invention may also be used to produce a sheet which does not have a rectangular section, for example a sheet having a cylindrical surface or an undulated surface. These may be obtained according to the invention by disposing the liquid which forms the bearing on a surface of a solid having the profile which is desired in the final product. In this case, one may use a multiplicity of small bearings in or on the shaped surface of the floor, so that the glass sheet will be supported as uniformly as possible by the projecting domes of the bearings.

It is important that the glass sheet completely cover the cavities and extend slightly beyond them in the lateral direction, in default of which the liquid in the cavities may be ejected by the pressure exercised by the weight of the glass.

The drawing of the glass sheet in the plastic state may be favored, in accordance with the invention, by increasing the viscosity of its edges; this may be accomplished by putting them in contact with a cooled, solid surface, for instance, by allowing the edges to slide on solid surfaces which are cooled to an appropriate temperature which raises their viscosity as much higher than that in the inward portions of the sheet as is desired.

During the preparation of the apparatus for use, or when one wishes to add liquid for any reason, it is sufficient to flow an excess of liquid from high points on the floor or simply from the head end. The excess of liquid, after filling the first cavities, flows on and fills successive cavities, and any final excess runs off at the sides or the ends. The cavities, in the case a horizontal flow, may intercommunicate through conduits in the material of the bed, but this intercommunication is not essential. The use of cavities which are independent makes it possible to construct the bed out of multiple elements which are readily interchanged in case of damage.

In the forms of the invention described, the bearing recesses formed in the floor cooperate with a liquid which does not wet the floor or the glass. However, those depressions which constitute recesses for the liquid bearings may be replaced by areas which are wetted by the liquid so that the liquid will attach itself there and form elevated bearing pads. These wetted zones may be made of solid metal which is capable of reacting with the molten metal of the bearing to form an interfacial alloy. Among the metals which are suitable for this purpose are iron and copper, when tin is the metal of the bearing. We have established the fact that it is preferable to choose metals which do not undergo the phenomenon of fissure corrosion, an example of which is provided by molybdenum.

The choice of the material for the solid floor which is not wetted depends upon the nature of the liquid used and the temperature to which it is subjected. In the case of molten tin, silica or agglomerated sillimanite may be used up to temperatures of 1,000° C. or somewhat higher. Graphite may also be used as it offers the advantage of being readily machined to an accurate surface and because, having good thermal conductivity, it is not fragile to thermal shock. Furthermore, it is particularly valuable when the temperature of the floor is to be controlled from the interior of the bed, for instance by passing heating or cooling fluids through laterally extending conduits, as it permits accurate thermal control of every stage of the process of all parts of the moving sheet.

According to one important form of the invention, the liquid is continuously introduced into contact with the lower surface of the glass sheet as it is received on the support, being admitted to the interface through multiple orifices which open onto the floor. These orifices may be pores or they may be conduits. The liquid which is introduced through the orifices may be in an amount adequate to form a continuous film under the glass, or the supply may be reduced so that the support is composed of separate drops or discontinuous films which are entrained by the glass sheet and drawn along the surface of the floor, being discharged and collected for return after having passed a predetermined course. Sometimes as indicated in the drawings, the liquid travels the whole length of the floor and in other cases the floor is interrupted by transverse canals, the sections between the canals being supplied with conduits and the conduits receiving the same or different liquids at the same or different temperatures as required by a particular operation.

In all the cases where the liquid supports are discontinuous, an important advantage is secured by reducing the time of contact between the glass and the liquid support compared to the duration of contact with a continuous body of liquid and a similar reduction in area of contact is provided by such discontinuous supports. These reductions will reduce the risk of interaction between the liquid and the glass.

It is also advantageous, when the liquid which constitutes the support is a metal or an alloy which can be oxidized, such as lead or tin, to establish a neutral or reducing atmosphere about the metal, between the glass and the floor, which makes it unnecessary to enclose the entire apparatus in a reducing or inert gas. It is sufficient to project the inert gas into the intervals between the discontinuous metal supports. If the solid floor is graphite, the gas may be introduced through the pores of the graphite.

A reducing atmosphere existing about the oxidizable liquid metal not only protects it from oxidation but at the same time protects the glass against reaction with the liquid metal. We have particularly established that silver, when used above 960° C. as a liquid support, does not diffuse into the glass if contact is made in an atmosphere of hydrogen. It is believed that the presence of hydrogen prevents the ionization of the silver and that, if reaction is to occur, ionization is necessary.

In that form of the invention in which the molten metal is interposed as a continuous sheet between the glass and the floor, the liquid should not wet the glass but it may wet the floor or not, in this particular form of the invention. If it is to wet the floor, the floor beneath the glass sheet may be composed of metal as described above. If it is not to be wetted, it may be composed of refractory materials such as graphite. It may be advantageous to have the continuous liquid support entrained by the glass, as this minimizes the frictional contact of the glass with the liquid and minimizes the internal friction of the liquid.

The surface tension of molten tin at a temperature about 900° C. to 700° C., the upper cooling range of the glass, is about 500 dynes per cm. The thickness of such liquid sheets when supporting a sheet of glass of about 5 mm. thickness is on the order of 4 mm. When the floor contains shallow trays or grooves, these are filled with a quantity of liquid somewhat superior to the volume of the cavity. When the weight of the glass rests upon the projecting portions of the liquid, the liquid above the cavity projects slightly beyond the edges of the cavity. The cavities may have a depth slightly superior to the thickness (sigma) of the liquid support at equilibrium between the forces of gravity and surface tension under the weight of the glass. When the sheet of glass moves slightly sidewise, the cylindrical surfaces which project beyond the cavities are deformed and create an opposing couple which tends to restore the sheet to straightline motion.

A particularity of the invention is that liquid is only in contact with the atmosphere at these cylindrical surfaces, which is extremely small. This greatly reduces the effect of oxidation even if no protective gas is used. If the liquid support is an oxidizable metal or one which is altered in any way by contact with the atmosphere, the possibilities of alteration are limited to these minimum exposed surfaces, particularly in the case of a liquid sheet supporting the glass sheet.

When the glass sheet has been cooled, as it rests on the liquid support, to a viscosity which will stand contact with ordinary mechanical handling means such as rollers, without marring, the liquid may be withdrawn and the sheet transferred to other transporting means. The liquid can be purified and reheated during recycling so as to introduce only unaltered liquid to the surface of the glass. Any method of forming the glass may be used, for instance rolling at high temperature, for instance as disclosed in French Pat. 1,231,129.

The sheet may be received either on a single liquid support or on several successive liquid bearing sheets, depending upon the phases of treatment which it is to undergo. The small thickness of the liquid ribbon allows it to be put into thermal equilibrium with the glass sheet rapidly and to cool as the same rate. The thinness of the liquid supports minimizes the transference of heat by convection from upstream to downstream, which is inevitably produced when the deep baths of the prior art, utilizing a molten metal of good thermal conductivity, are used.

The temperature of the molten metal as it is brought into contact with the glass sheet is adjusted to achieve these thermal treatments which are desired at the point of introduction. In particular, the cooling of the sheet in contact with the molten metal may be conducted progressively by avoiding the formation of a substantial temperature difference between the upper and lower faces of the sheet. Thus, the temperature of the liquid put into contact with the lower face of the sheet may be similar to the temperature of the gases above the sheet at the same location. This method of cooling avoids the local deformations of surface which result in that surface defect which is called "hammered." This advantage combines with the firm support offered by the floor to produce an improved sheet of glass which has a fire polish substantially free from the habitual visual deformations.

The liquid which is used should not decompose at the range of temperatures of the glass, that is to say between 1,100° and 500° C. for ordinary silica-soda-lime glass. The ranges differ somewhat for glasses of other composition. The liquid must not chemically react with the glass and should not wet the glass. It must have a surface tension which will adequately resist disruption between the moving glass and fixed support. A surface tension of several hundreds of dynes is adequate. The density of the liquid is not too important as a density even less than that of the glass may be satisfactory.

Among the liquids which are satisfactory under these circumstances are the noble metals, particularly silver and gold, and molten tin. An advantage of the invention is that it makes the use of noble metals practicable. It is advantageous to use metals which have lower rather than higher viscosity at the temperature of use, as this reduces the braking effect applied to the glass sheet. This is more important when the metal is in the form of bearings occupying fixed positions than when the metal is entrained by the glass. The floor is advantageously constructed of material which is a good conductor of heat so as to facilitate thermal exchange and permit ready thermal conditioning of the glass. When using tin, the floor is advantageously graphite. The floor may be cooled by any desired means to progressively decreasing temperatures and similar cooling means may be disposed above the sheet so that the reduction in temperature will progress evenly above and below the sheet. Transverse tubes have been illustrated in the drawings as projecting through the material of which the bed is composed. Similar tubes may be arranged above the bed and these tubes may be subjected to progressively decreasing temperatures after the leveling of the surface of the sheet has taken place on the floor.

The films of molten metal will support greater and greater weights of glass without breaking, as the radius of the meniscus at the border becomes smaller and smaller and the forces of surface tension greater and greater so that theoretically no rupture of the liquid layer can occur. In practice this theory is sufficiently correct, as the thin films and bearings of molten metal will support all thicknesses of glass sheeting which are customarily made, including the thick sheets used in the making of glass doors and sheets of about one inch. In practice, whatever the metal may be and whatever its temperature in the molten state, its thickness does not differ greatly from about 4 mm. when it is carrying a glass sheet of ordinary thickness from a quarter to a half inch. Consequently, one may choose the metal freely, having regard mainly to its stability with respect to the glass and with regard to its hydrophylic and hydrophobic (capillary) effect with respect to the glass and to the floor. As far as surface tension concerned, most molten metals are satisfactory. However, those which have a high vapor tension at the temperature of operation are avoided in favtor of those which have low or no vapor tension. Tin and its alloys are satisfactory in most circumstances. The vapor tension of mercury is so high that it is avoided under most circumstances.

Practically speaking, whatever is the temperature employed for the casting of glass, and this will vary somewhat with different kinds of glass, the molten metals, at such temperatures, have surface tensions which approximate 500 dynes per cm. The metal, under the circumstances of use related herein, does not take the shape of a drop but of a plane pad of several mm. thickness, the edges of which are rounded. Consequently, the glass sheet rests upon a perfectly plane surface. In general the viscosity of the liquid metals is very low and varies so little from one metal to another that this quality does not present a problem.

When the sheet leaves the deep baths of the prior art, upon which it floats, it must, to avoid contact with the borders of the tank containing the liquid, leave the horizontal plane and be lifted to a level which is higher, for example onto a roller conveyor above the bath level.

That requires that the sheet shall be sharply chilled during this stage in order to prevent the change of direction from introducing surface deformations. That disadvantage of the prior art is overcome in the present invention by the use of the surface tension to sustain the glass sheet on a solid floor. Substantially speaking, it is the force of surface tension which support the glass in some phases of this invention. In the present invention, the glass may be drawn horizontally from the surface of the liquid support, thus avoiding the internal and surface displacements which occur when the glass is bent to raise it to the level of a higher conveyor and which occur in the relatively unbalanced cooling of the prior art.

The temperature of the supporting liquid in this invention is regulated to secure those conditions which are necessary to produce the qualities of surface desired in the glass, as well as to control the rate of cooling. For example, the cooling of the sheet can be carried out progressively at such a rate as to avoid those local deformations of surface which arise either from the establishment of too great a temperature differential between upper and lower parts of the sheet or from too sharp a temperature differential longitudinally of the sheet. The glass formed by the new process is fire polished and lacks the defects of surface which arise from bending and the defects of surface which arise from temperature gradients.

The bearing pits may be of different forms, arrangements and dimensions, such as circular, elliptical, rectangular, linear, continuous or interrupted.

When there is relative movement between the glass and the floor, the spacing of the bearings may be greater than when the sheet is to be stopped on the floor for some treatment either thermal or mechanical. In all cases, the process can be made to support the glass without any contact with the solid face of the floor and it is only when such contact is desired that it occurs. The glass may be passed through zones of decreasing temperatures which progressively anneal without altering the surface. The process is especially advantageous because it permits the use of liquid supports of different kinds or temperatures over which the glass passes in sequence at a temperature at which the metal bearings, or lubricant, is still liquid. There is a relation between the speed of the sheet and the interval between the liquid bearings and this is to some extent a function of the viscosity of the glass sheet.

As many apparently widely different embodiments of the present invention may be made without departing from the spirit and scope thereof, it is to be understood that the specific embodiments do not constitute a limitation on the generality of what has been stated herein.

What is claimed is:

1. Apparatus for the handling of flat glass which comprises a floor adapted to carry a sheet of glass, means to form a sheet of glass, to lay it on the floor, and move it over the floor, and a liquid medium interposed and acting as a bearing between the floor and the sheet consisting essentially of molten metal in just sufficient thickness when balanced between the surface tension of the metal and the force of gravity acting on the sheet to carry the sheet out of contact with the floor.

2. Apparatus according to claim 1 including means to flow a sheet of molten metal over the floor beneath the glass sheet, therewith to form the said liquid medium.

3. Apparatus according to claim 1 including depressions in the floor and molten metal in the depressions extending above floor level.

4. Apparatus according to claim 3 including means to heat the floor to a temperature at which the interposed metal is molten.

5. Apparatus according to claim 3 in which the depressions are trays approximating the width of the glass sheet, but not exceeding said width.

6. Apparatus according to claim 3 in which the depressions are a multiplicity of pits.

7. Apparatus according to claim 3 in which the depressions are a multiplicity of grooves extending approximately the width of the glass sheet, but not exceeding said width.

8. Apparatus according to claim 3 in which the depressions are close to one another substantially throughout the plastic area of the glass, the gaps being insufficient to permit the glass to sag between the molten metal in the depressions and on the order of 1 mm.–1 cm.

9. Apparatus according to claim 3 in which the floor is transversely curved.

10. Apparatus according to claim 1 in which the floor comprises alternate lands and grooves, and the apparatus includes means to flow molten metal to the surface of the lands including conduits opening at the surface of the lands, and means to drain the grooves of the metal that flows there from the lands.

11. Apparatus for the support and transportation of flat glass in a plastic state which comprises supporting means having a floor adapted to carry a sheet of glass, molten metal on the floor disposed in a thin sheet to furnish support to a glass sheet substantially throughout the length and breadth of the part thereof which is to be supported out of contact with the floor, means to lay a sheet of plastic glass on the molten metal, and means to move the sheet over the floor.

12. Apparatus according to claim 11 including a circulating system in which drainage channels are provided adjacent the floor, and pumping and conduit means connect the channels to conduits opening between the glass and the floor.

13. Apparatus according to claim 11 in which the floor comprises parts which are and parts which are not wetted by the molten metal, the parts which are not wetted surrounding the parts which are wetted.

14. Apparatus for receiving and supporting sheet glass comprising a refractory floor, a chamber thereunder, conduits leading from the chamber to the floor, means to flow molten metal from the chamber to the floor, and conduit means to return metal from the floor to the chamber.

15. Apparatus according to claim 14 in which the conduits are tubular.

16. Apparatus according to claim 14 in which the conduits are pores in the floor.

17. Apparatus according to claim 1 in which the edges of the glass sheet formed by the forming means extend beyond the molten metal, and cooling means extend along and engage the edges of the glass.

18. Apparatus for the support of molten flat glass which comprises a receiving floor, a sheet of molten metal which does not wet glass and does not wet the floor, lying on the floor in capillary thickness, and heating means to keep the metal molten.

19. Apparatus according to claim 18 in which the flat support comprises a shallow trough.

20. Apparatus according to claim 18 also including retaining walls for the metal, and means to establish a liquid metal level higher than the retaining walls.

21. Apparatus for handling moving flat sheet material which comprises a floor and liquid bearings thereon mounted in depressions in the floor and projecting above the level of the floor in a state of balance between the forces of surface tension and gravity.

22. Apparatus according to claim 11 in which the floor comprises alternate lands and grooves, and the apparatus includes means to flow molten metal to the surface of the lands including conduits opening at the surface of the lands, and means to drain the grooves of the metal that flows there from the lands.

23. Apparatus according to claim 22 comprising means to bring a protecting gas into contact with the inferior face of the glass sheet through the intervals between the lands covered by the liquid films.

24. Apparatus according to claim 7 comprising means to bring a protecting gas into contact with the inferior face of the glass sheet through the intervals between the areas covered by the molten metal.

25. Apparatus according to claim 3 in which the floor has a transverse shape corresponding to the profile to be given to the glass sheet.

26. Apparatus according to claim 7 in which the transverse grooves are non-rectilinear.

27. Apparatus for handling flat glass which comprises a substantially continuous, solid floor adapted to carry a sheet of glass, and a liquid bearing interposed between the solid floor and the glass, consisting essentially of molten metal subdivided into a multiplicity of units separated from each other having lateral dimensions which furnish support substantially throughout the main body of the glass sheet and vertical dimensions which provide lateral boundaries above the floor level.

28. The apparatus of claim 1 in which the floor and the liquid medium are different metals which form an interfacial alloy.

29. The apparatus of claim 28 in which the floor is composed of one of the group of metals consisting of iron and copper and the bearing metal is tin.

30. In a method of making flat glass wherein a sheet of flat glass is formed from molten glass and is deposited on and moved over the receiving floor of a solid bed, the step which comprises interposing between the sheet and the floor a support of molten metal of thickness measured above the floor not substantially greater than that of the glass sheet, not larger than the glass sheet, and so disposed as to separate the sheet from the floor, cooling the sheet progressively as it advances over the floor until it can be handled without damage by other handling means, and transferring the glass to other handling means.

31. In a method of handling flat glass wherein a sheet of flat glass is deposited on and moved over a receiving floor forming part of a solid bed, the step which comprises interposing between the sheet and the floor a support of molten meltal of thickness measured above the floor not substantially greater than that of the glass sheet, and so disposed as to separate the sheet from the floor, cooling the sheet and transferring the glass to other handling means, the molten metal being noncapillary and supporting the glass by surface tension .

32. The method of claim 31 in which the molten metal is a bearing pad.

33. In a method of handling flat glass wherein a sheet of flat glass is deposited on and moved over a receiving floor forming part of a solid bed, the step which comprises flowing between the sheet and the floor a continuous sheet of molten metal of thickness measured above the floor not substantially greater than that of the glass sheet, and so disposed as to separate the sheet from the floor, cooling the sheet and transferring the glass to other handling means.

34. In a method of handling flat glass wherein a sheet of flat glass is deposited on and moved over a receiving floor forming part of a solid bed, the step which comprises interposing between the sheet and the floor a support of molten metal of thickness measured above the floor not substantially greater than that of the glass sheet, and so disposed as to separate the sheet from the floor, cooling the sheet and transferring the glass to other handling means, the metal support comprising a plurality of molten metal bearings.

35. A method of casting flat glass which comprises forming a sheet from molten glass, flowing a thin sheet of molten metal over a supporting, solid surface, laying the glass sheet on the flowing molten metal, moving the glass sheet over the floor on the metal, and cooling the glass sheet as it moves over the surface.

36. A method of protecting glass in contact with a plurality of molten ionizable metal bearings against interaction therewith which comprises suffusing the area about the region of contact with the bearings with a gaseous inhibitor of ionization.

37. The method of casting flat glass which comprises forming a sheet from molten glass, forming a sufficient quantity of molten noncapillary metal in a state of equilibrium between the forces of surface tension and the forces of gravity to receive and support the glass sheet, laying the glass sheet upon the molten metal and moving it thereover, cooling the glass sheet in contact with the molten metal, and transferring the sheet to other supporting means.

38. A method of casting flat glass which comprises forming a sheet from molten glass, forming upon a floor a supporting body of molten metal into discrete units in a state of equilibrium between the forces of gravity and surface tension which offer mutual support to the sheet substantially throughout the area of the sheet which is to be separated from the floor, laying the glass sheet on and moving it over the discrete units, cooling the glass sheet in contact with the discrete units, and transferring it to other handling means.

39. A method of casting flat glass which comprises establishing an elongated bed of molten metal, which does not wet the glass, in a shallow trough which is not wetted by the molten metal, to a depth which lifts the surface of the metal above the upper level of the trough, casting molten flat glass onto the upper surface of the molten metal, moving the sheet toward a place of discharge from the bed, and cooling the sheet on the bed to a temperature at which it can be handled at the place of discharge.

40. A method of transporting a glass sheet in a plastic state in which the glass sheet is deposited on a solid surface which comprises interposing between said solid surface and the glasses sheet a liquid film acting as lubricant for facilitating the gliding of the glass sheet on said support.

41. A method according to claim 30 in which the floor is curved and a liquid support is disposed thereon, whereby the sheet receives a profile corresponding to that of the floor before being removed therefrom.

42. In a method of handling flat glass wherein a sheet of flat glass is deposited on and moved over a receiving floor forming part of a solid bed, the step which comprises interposing between the sheet and the floor a support of molten metal of thickness measured above the floor not substantially greater than that of the glass sheet, and so disposed as to separate the sheet from the floor, the edges of the glass sheet projecting beyond the liquid support, cooling such edges to a relatively more rigid state than the remaining part of the sheet as it progress along the floor, cooling the sheet and transferring the glass to other handling means.

43. The method of forming a supporting surface for a refractory, moving sheet which comprises applying to a metallic table a molten metal which forms an interfacial alloy with the metal of the table, and maintaining the molten metal in molten condition.

References Cited
UNITED STATES PATENTS

| | | | |
|---|---|---|---|
| 789,911 | 5/1905 | Hitchcock | 65—182 |
| 810,865 | 1/1906 | Hoover et al. | 65—182 |
| 1,622,817 | 3/1927 | Waldran | 65—182 |
| 2,805,989 | 9/1957 | Willis, Jr. | 65—182 UX |
| 2,878,621 | 3/1959 | Zellers, Jr., et al. | 65—182 |
| 3,031,275 | 4/1962 | Shockley | 65—182X |
| 2,298,348 | 10/1942 | Coxe | 65—182UX |
| 3,150,948 | 9/1964 | Gladieux et al. | 65—182 |

FOREIGN PATENTS

| | | | |
|---|---|---|---|
| 874,534 | 8/1961 | Great Britain | 65—182 |

FRANK W. MIGA, Primary Examiner

U.S. Cl. X.R.

65—92, 99, 182